(12) United States Patent
Clark

(10) Patent No.: US 11,758,902 B2
(45) Date of Patent: Sep. 19, 2023

(54) RETRACTABLE DUCK DECOY WEIGHT

(71) Applicant: Jacob Clark, London, OH (US)

(72) Inventor: Jacob Clark, London, OH (US)

( * ) Notice: Subject to any disclaimer, the term of this patent is extended or adjusted under 35 U.S.C. 154(b) by 445 days.

(21) Appl. No.: 16/846,595

(22) Filed: Apr. 13, 2020

(65) Prior Publication Data

US 2020/0323196 A1  Oct. 15, 2020

Related U.S. Application Data

(60) Provisional application No. 62/832,327, filed on Apr. 11, 2019.

(51) Int. Cl.
 *A01M 31/06* (2006.01)
 *B65H 75/48* (2006.01)

(52) U.S. Cl.
 CPC .......... *A01M 31/06* (2013.01); *B65H 75/486* (2013.01)

(58) Field of Classification Search
 CPC .................................................. A01M 31/06
 USPC ......................................... 43/2, 44.96, 43.11
 See application file for complete search history.

(56) References Cited

U.S. PATENT DOCUMENTS

| 2,523,811 | A | * | 9/1950 | Buehl | A01M 31/06 43/43.1 |
| 3,322,433 | A | * | 5/1967 | Rentschler | B32B 27/00 525/104 |
| 3,532,289 | A | * | 10/1970 | Sutz | A01K 89/046 242/404.1 |
| 4,088,281 | A | * | 5/1978 | Close | B60R 22/44 242/375.3 |
| 4,340,192 | A | * | 7/1982 | Burris, III | A01M 31/06 242/385.4 |
| 4,402,473 | A | * | 9/1983 | Kubota | B60R 22/415 242/384.7 |
| 4,523,726 | A | * | 6/1985 | Swisher | A01K 89/0102 74/576 |
| 4,827,653 | A | * | 5/1989 | Sewell | A01M 31/06 43/2 |
| 5,238,201 | A | * | 8/1993 | Jonushaitis | B65H 75/4478 242/405.3 |
| 5,938,140 | A | * | 8/1999 | Fundak | B65H 75/406 242/396.5 |
| 5,941,008 | A | * | 8/1999 | Schmidt | A01M 31/06 43/2 |
| 6,487,811 | B2 | | 12/2002 | Barrett | |

(Continued)

*Primary Examiner* — Peter M Poon
*Assistant Examiner* — Kari A Bradberry
(74) *Attorney, Agent, or Firm* — Shumaker, Loop & Kendrick, LLP; James D. Miller

(57) ABSTRACT

A weight retraction device for use with a waterfowl decoy includes a housing having a spool rotatably coupled thereto. A weight is attached to a line that is wound around the spool. Rotation of the spool in a first rotational direction causing an unwinding of the line from the spool to cause the weight to extend away from the housing while rotation of the spool in a second rotational direction causing a rewinding of the line back onto the spool to cause the weight to retract back towards the housing. A power spring is configured to urge the spool to rotate in the second rotational direction. A lock release mechanism is configured to normally be in a locked configuration for preventing an undesired rotation of the spool in the second rotational direction. A manual actuation of the lock release mechanism releases the locked configuration of the lock release mechanism.

13 Claims, 11 Drawing Sheets

(56) References Cited

U.S. PATENT DOCUMENTS

| | | | |
|---|---|---|---|
| 6,760,993 B2 | 7/2004 | Lebens | |
| 7,374,123 B2* | 5/2008 | Han | A45F 5/004 |
| | | | 242/385.2 |
| 9,185,903 B2 | 11/2015 | Paternostro | |
| 9,924,710 B1 | 3/2018 | Wilson et al. | |
| 10,555,518 B2* | 2/2020 | Anderson | A01M 31/06 |
| 10,968,072 B1* | 4/2021 | Vardian | B65H 75/4471 |
| 2003/0173445 A1 | 9/2003 | Lebens | |
| 2004/0163300 A1* | 8/2004 | Pinkston | A01M 31/06 |
| | | | 43/3 |
| 2008/0155879 A1 | 7/2008 | Whipple et al. | |
| 2010/0011650 A1 | 1/2010 | Leonards, Sr. | |
| 2013/0014423 A1* | 1/2013 | Tonkovich | A01M 31/06 |
| | | | 43/3 |
| 2014/0238314 A1* | 8/2014 | O'Brien | A01K 27/004 |
| | | | 119/796 |
| 2015/0059227 A1* | 3/2015 | Kubinec | A01M 31/06 |
| | | | 43/2 |
| 2015/0059229 A1* | 3/2015 | Miller | A01M 31/06 |
| | | | 43/3 |

* cited by examiner

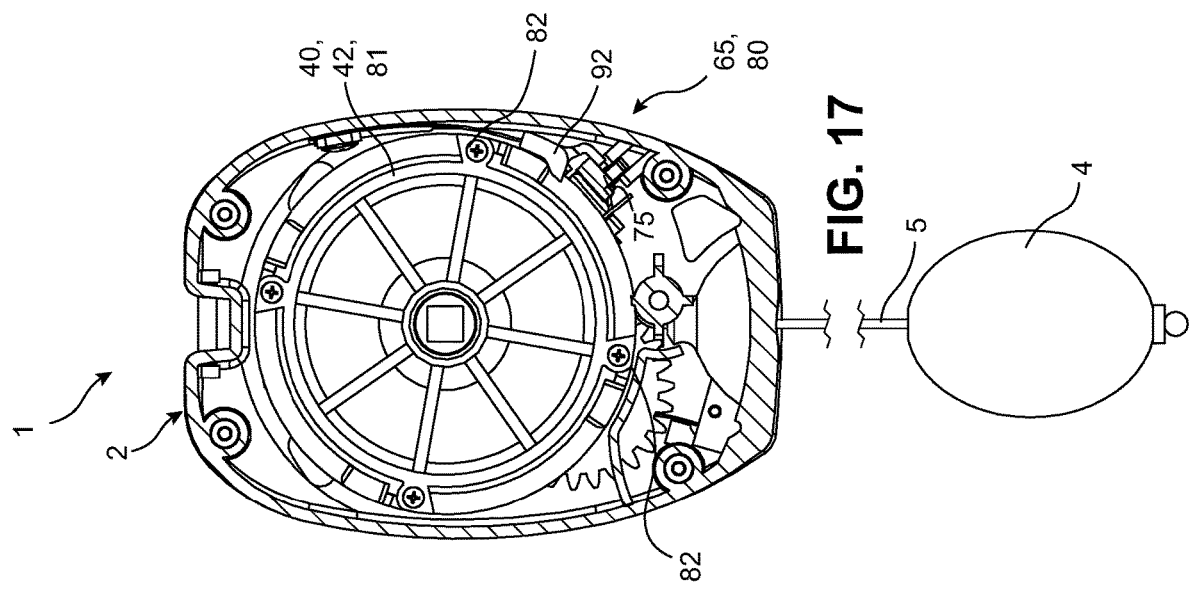
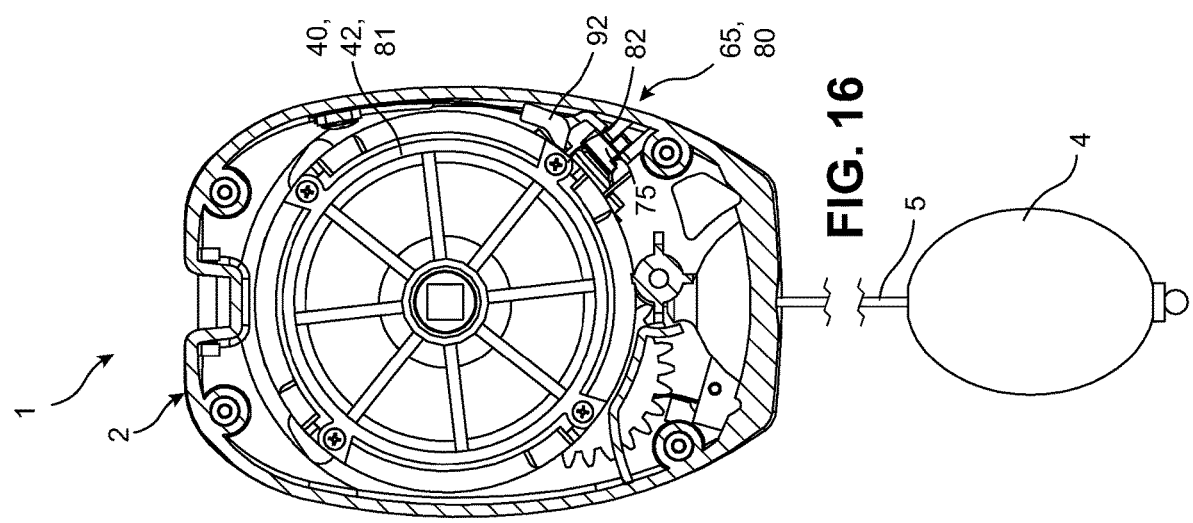

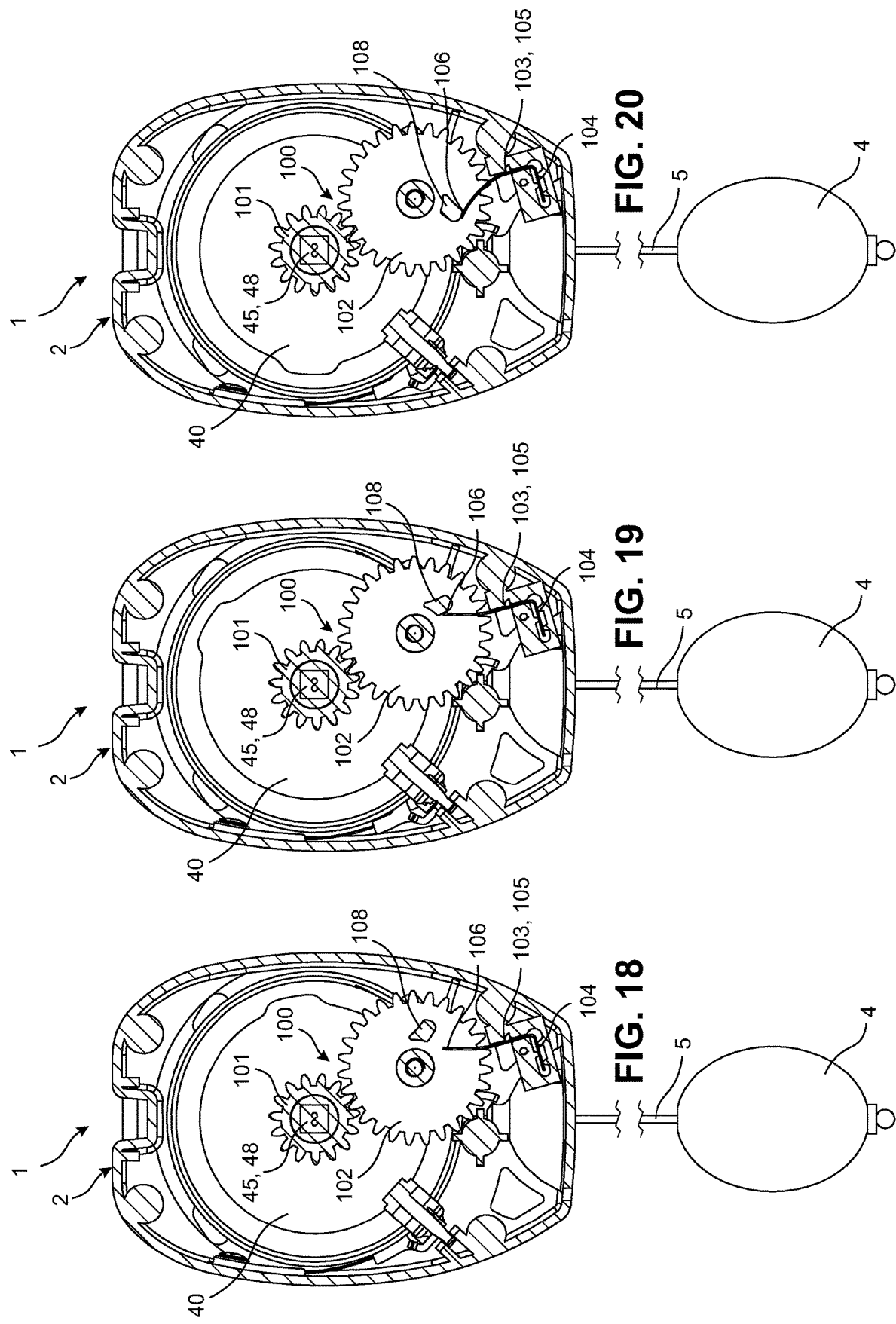

RETRACTABLE DUCK DECOY WEIGHT

This patent application claims priority to U.S. Provisional Patent Application Ser. No. 62/832,327, filed on Apr. 11, 2019, the entire disclosure of which is hereby incorporated herein by reference.

FIELD

Field of the Invention

The present invention relates generally to a device for retracting a weight to be attached to a floating waterfowl decoy, and more specifically, to a device configured to place a line attached to the weight in a locked position when the line has been extended to a desired length from the device and to then retract the weight from the locked position in response to an operator manually actuating a lock release mechanism.

Background of the Invention

The use of decoys for hunting waterfowl is widely utilized by waterfowl hunters as these decoys aid in attracting the waterfowl to the area being hunted. Such waterfowl decoys are typically deployed to float on top of a body of water with the intention of the decoys remaining in place during the hunting session. However, the body of water having the decoys may be subjected to wind above the surface of the body of water or a water current present within the body of water that tends to cause the decoys to float away from the desired location, which in turn negatively affects the ability of the hunter to maintain a desired grouping of the decoys adjacent the desired hunting area.

In order to overcome this concern, such decoys are typically coupled to an anchoring weight via a flexible line with the weight disposed at a desired depth below the surface of the body of the water. The line may, for example, be coupled to a keel of the decoy disposed below the surface of the body of water with the line having a desired length for reaching a desired depth within the body of water. As a general rule, it is desirable for the line to include a depth substantially equal to the depth of the water at the given location where the hunter desires to maintain the decoys. If the line is too long, the decoys may tend to float within a greater range than is desired or may cause the decoys to undesirably interact with each other. In contrast, if the line is too short, the anchoring capabilities of the weight may be compromised and the decoys may float to undesired positions.

The use of a simple line that is attached to the decoy according presents several issues in attempting to reach the desired length of the line with respect to the given depth of the water chosen for the hunting position. The hunter must either preselect a line having a length that corresponds to the given depth or the hunter must somehow adjust the length of the line when attaching the line to the bottom of the decoy. Additionally, when retracting the line the hunter must utilize the time-consuming method of hand-retracting the line when it is desired to leave the given location at the conclusion of the hunting session or when it is desired to reposition the decoys. It is not uncommon for such waterfowl hunters to utilize as many as 60 such decoys at a given location, so this process becomes excessively cumbersome as a result of the large number of retractions that must be performed each time the decoys are removed from the given location.

In order to overcome these concerns, systems have been developed to retract such weighted lines using a retraction device such a hand cranked spool mechanism or automatic retraction mechanism. However, such mechanisms usually include various shortcomings that make the current solutions disadvantageous. The use of a hand cranked spool mechanism or the like still requires significant manual effort by the operator than is desirable, thereby still presenting a time and energy consuming endeavor. Additionally, the known automatic retraction methods present numerous difficulties in certain situations as well as various safety concerns. For example, such automatic retraction methods often include complicated mechanisms that are difficult to manipulate for various users, and especially in certain situations such as when hunting during periods of time or in locations with insufficient light. Furthermore, the known automatic retraction methods tend to retract the line in at an undesirably fast or indeterminate speed that renders it difficult to safely handle the device having the automatic retraction mechanism. For example, if the weight is retracted at an especially fast speed, the weight may be caused to strike a portion of the operator at a high velocity after suddenly exiting the water. In other circumstances, the operator may attempt to slow the weight down when approaching the operator at the high velocity by grabbing the line, which in turn tends to cause burns or lacerations. The current automatic retraction methods also render it difficult to determine the length of the line that has been let out or retracted, which makes it difficult to know when the weight is about to reach the position of the retraction mechanism.

For each of the reasons outlined above, an improved weight retraction device for use with waterfowl decoys overcoming the shortcomings of the prior art is desirable.

SUMMARY OF THE INVENTION

In concordance and agreement with the present invention, a new and improved weight retraction device for use with waterfowl decoys has surprisingly been discovered.

According to an embodiment of the present invention, a weight retraction device for use with a waterfowl decoy is disclosed. The weight retraction device comprises a housing defining an interior compartment thereof. A spool is rotatably disposed within the interior compartment of the housing. A weight is attached to a line that is configured to be wound around the spool. A rotation of the spool in a first rotational direction causes an unwinding of the line from the spool to cause the weight to extend away from the housing while a rotation of the spool in a second rotational direction causes a rewinding of the line back onto the spool to cause the weight to retract back towards the housing. A power spring is configured to urge the spool to rotate in the second rotational direction. A lock release mechanism is configured to normally be in a locked configuration for preventing an undesired rotation of the spool in the second rotational direction. A manual actuation of the lock release mechanism by an operator of the device releases the locked configuration of the lock release mechanism, thereby allowing the spool to rotate in the second rotational direction for retracting the weight back towards the housing.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein:

FIG. 16 is a fragmentary cross-sectional elevational view of the weight retraction device from the same perspective as FIG. 13, wherein the pawl is in the released position allowing for a ratchet tooth of a spool of the weight retraction device to pass by the pawl during the retraction of the weight towards the housing of the weight retraction device;

FIG. 17 is fragmentary cross-sectional elevational view of the weight retraction device from the same perspective as FIG. 13, wherein the pawl is moved back towards the locked position for engaging one of the ratchets of the spool of the weight retraction device for establishing a new position of the weight relative to the housing of the weight retraction device;

FIG. 18 is a fragmentary cross-sectional elevational view of the weight retraction device as shown from the perspective of section lines 18-18 of FIG. 4, wherein a resilient strip of a distance indicating mechanism of the weight retraction device is in a non-engaged configuration;

FIG. 19 is a fragmentary cross-sectional elevational view of the weight retraction device from the same perspective as FIG. 18, wherein the resilient strip of the distance indicating mechanism is in an initial engaging position during an extension of the weight away from the housing of the weight retraction device;

FIG. 20 is a fragmentary cross-sectional elevational view of the weight retraction device from the same perspective as FIG. 18, wherein the resilient strip of the distance indicating mechanism is in a maximally flexed position during the extension of the weight away from the housing of the weight retraction device;

DESCRIPTION OF THE PREFERRED EMBODIMENTS

The following detailed description and appended drawings describe and illustrate various exemplary embodiments of the invention. The description and drawings serve to enable one skilled in the art to make, and use the invention, and are not intended to limit the scope of the invention in any manner. With respect to the methods disclosed, the steps presented are exemplary in nature, and thus, the order of the steps is not necessary or critical.

Figure 7:
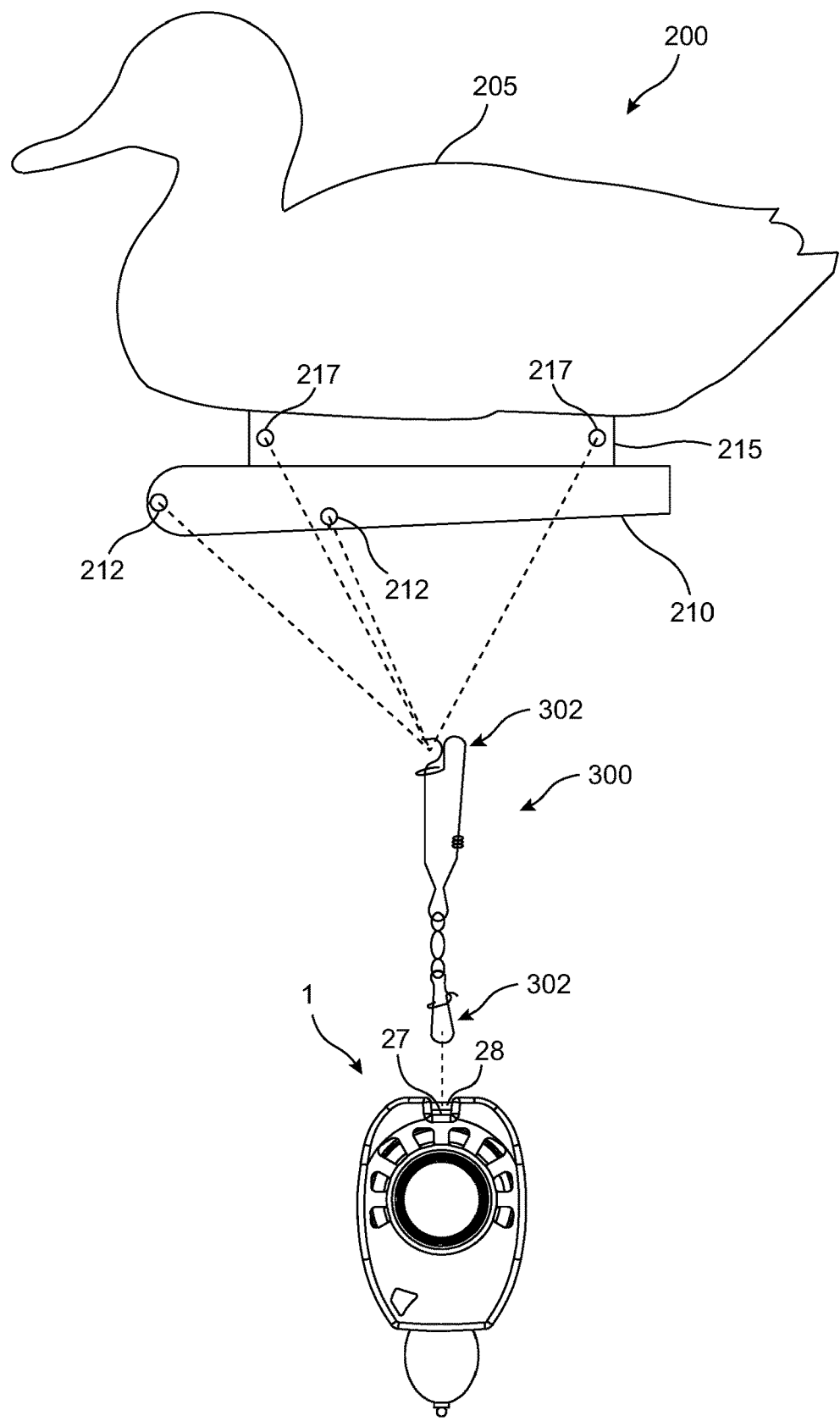
FIG. 7 is a front elevational view showing a method of coupling the weight retraction device to a waterfowl decoy using an exemplary connector.

FIGS. 1-22 illustrate a weight retraction device 1 for use with waterfowl decoys according to an embodiment of the present invention, wherein the weight retraction device 1 is referred to as the device 1 hereinafter for brevity. As shown in FIG. 7, the device 1 is configured for removable coupling to an associated waterfowl decoy 200. The waterfowl decoy 200 may be representative of any type of decoy typically configured to float on the surface of a body of water, such as the duck-shaped decoy illustrated herein. However, one skilled in the art should appreciate that the device 1 may be configured for use with any type of decoy configured for floating on an associated body of water without necessarily departing from the scope of the present invention, including any type of waterfowl decoy or any other similar structures that may be in need of anchoring to a specific position on the associated body of water.

The device 1 includes a housing 2 and an externally disposed weight 4. The weight 4 is configured to be variably extended away from the housing 2 and then retracted thereto via the actuation of various mechanisms disposed within a hollow interior compartment 3 of the housing 2, as explained in greater detail hereinafter. The weight 4 is coupled to a flexible line 5 (FIG. 6) that is selectively extended away from the housing 2 for prescribing a desired distance of the weight 4 from the housing 2 when the device 1 is coupled to the associated waterfowl decoy 200, wherein the desired distance is typically representative of the depth of the water where the waterfowl decoy 200 is deployed so as to allow the weight 4 to rest on the underwater ground surface to sufficiently anchor the waterfowl decoy 200 to a specific position on the surface of the body of water.

The line 5 may be formed from any suitable elongate and flexible material capable of withstanding the tensile forces acted thereon between the housing 2 and the weight 4 during operation of the device 1. The line 5 may be representative of any suitable type of thread, wire, rope, or the like, that is also capable of being wound and unwound for lengthening and shortening the extent of the line 5 disposed outwardly from the housing 2, as desired. The line 5 may be provided to include any desired length applicable to the given application. For example, the device 1 may be provided to include the line 5 having a length of 5 feet, 10 feet, 15 feet, or 20 feet, as non-limiting examples. However, the line 5 may have any total length while remaining within the scope of the present invention.

The line 5 may be formed from a single extension of material or may be formed by a braid of multiple extensions of material, as desired. The line 5 may also be formed from a polymeric material, a flexible metallic material, or a fabric-like material without departing from the scope of the present invention. In a preferred embodiment, the line 5 may be formed from a polymeric material that is further tar-coated to impart durability and resistance to the elements to the line 5.

Figure 3:
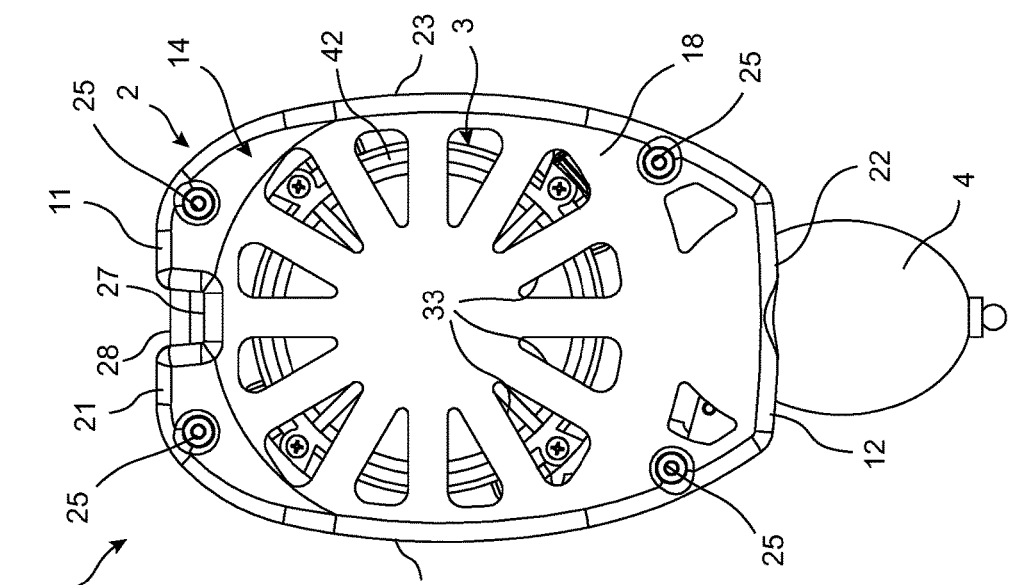
FIG. 3 is a rear elevational view of the weight retraction device.
Figure 2:
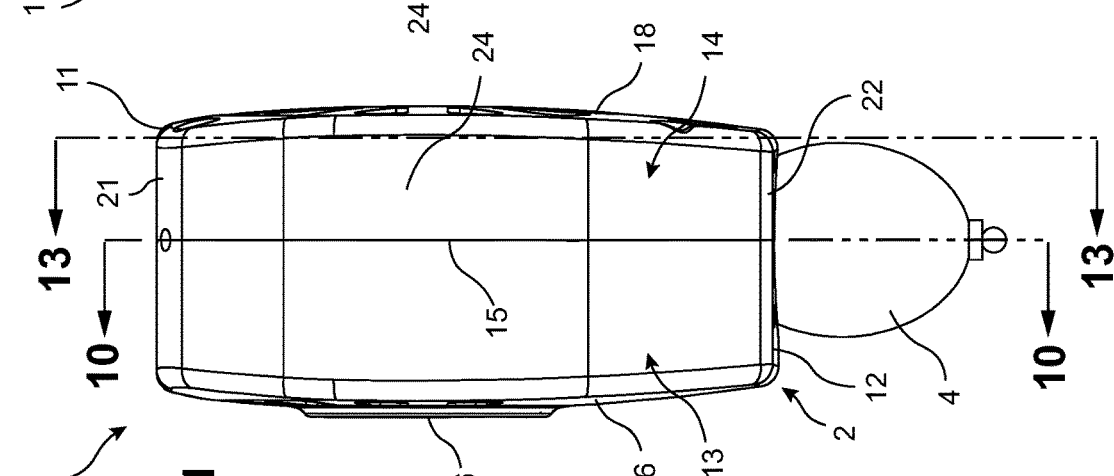
FIG. 2 is a right side elevational view of the weight retraction device.
Figure 1:
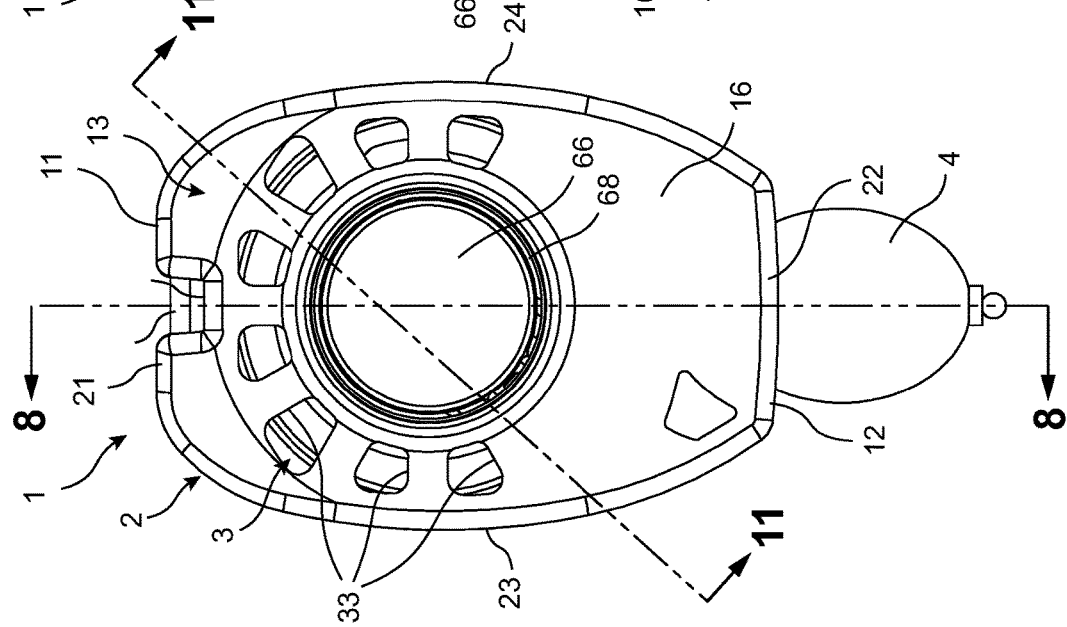
FIG. 1 is a front elevational view of a weight retraction device for use with waterfowl decoys according to an embodiment of the present invention.
Figure 4:
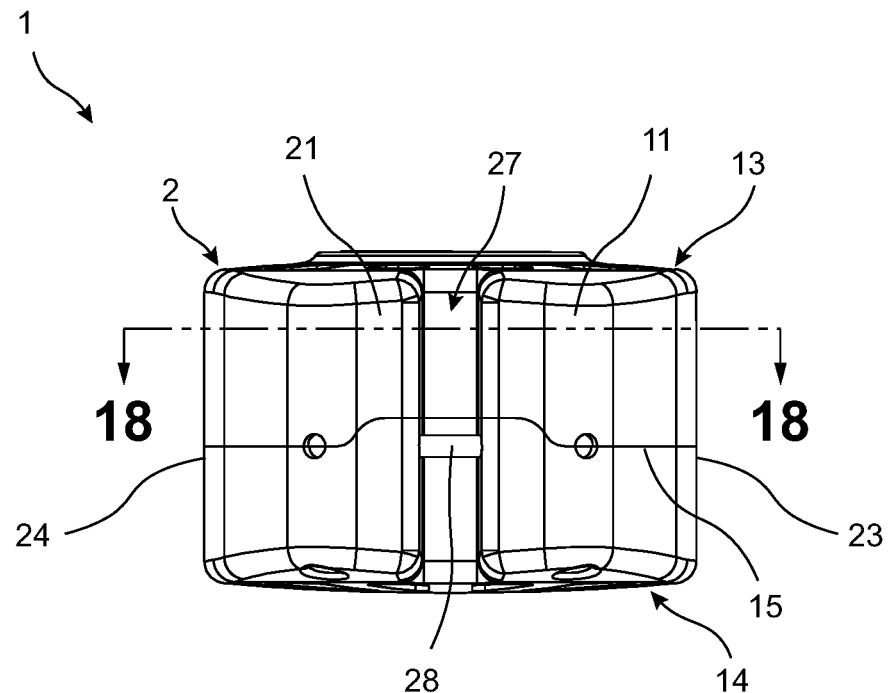
FIG. 4 is a top plan view of the weight retraction device.
Figure 5:
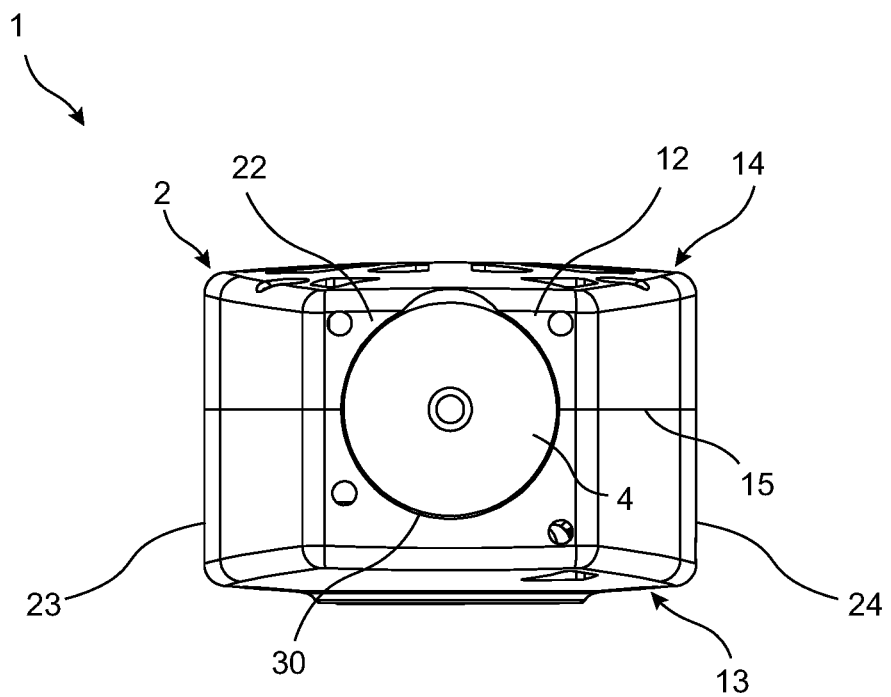
FIG. 5 is a bottom plan view of the weight retraction device.
Figure 6:
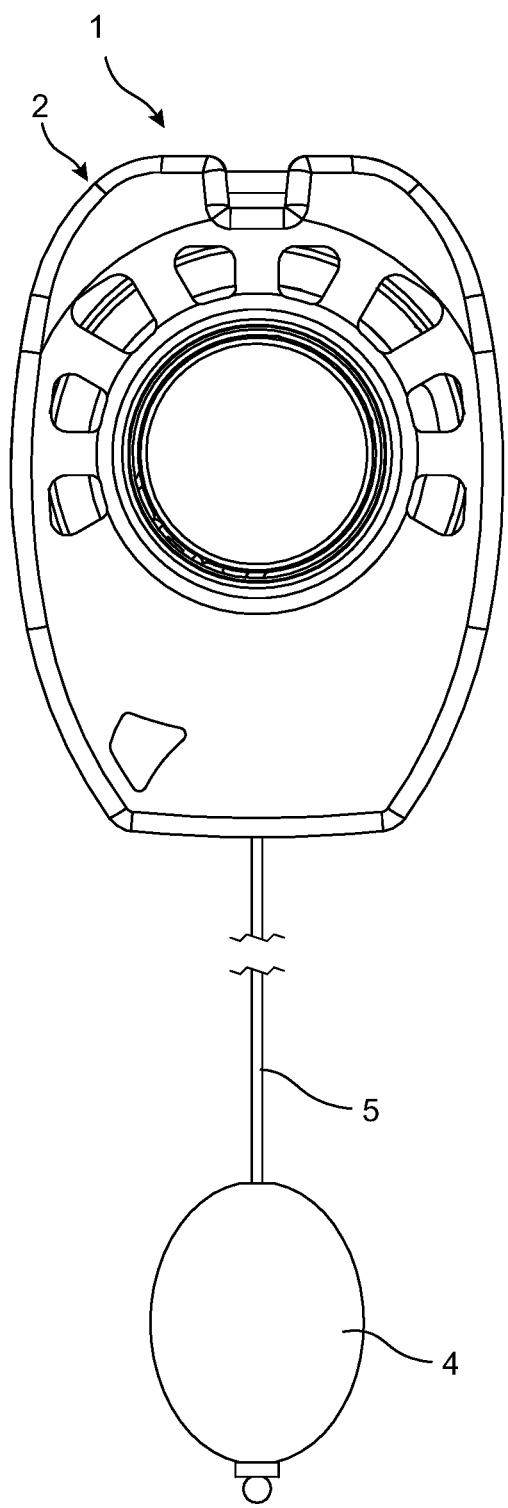
FIG. 6 is a fragmentary front elevational view of the weight retraction device with a weight extended from a housing thereof.

The housing 2 extends longitudinally from a first end 11 to an opposing second end 12 thereof. As explained hereinafter, the first end 11 of the housing 2 is configured for removable coupling to the associated waterfowl decoy 200 and the weight 4 is configured to be extended away from or retracted back towards the housing 2 at a position adjacent the second end 12 thereof. The housing 2 is illustrated as including a substantially elongate rounded-rectangular or elliptical profile shape when viewed from the front or the rear perspectives as the housing 2 extends between the opposing first and second ends 11, 12 (FIGS. 1 and 3, respectively). The housing 2 is further illustrated as including a substantially rectangular or rounded rectangular profile shape when viewed from a side perspective (FIG. 2). However, it should be apparent to one skilled in the art that the housing 2 may take on any of a variety of different shapes while remaining within the scope of the present invention so long as the housing 2 is shaped and dimensioned for receiving the various different mechanisms as described hereinafter for extending and retracting the weight 4 and the line 5 in accordance with the novel features of the present invention.

As best shown throughout FIGS. 1-5, the housing 2 is illustrated as including a thin-walled front housing shell 13 and a cooperating thin-walled rear housing shell 14 that meet along a peripherally extending seam 15 for enclosing the interior compartment 3 of the housing 2. The front housing shell 13 includes a front wall 16 and a plurality of transverse walls extending from a periphery of the front wall 16 and extending in a thickness direction of the housing 2 before terminating at the seam 15. The rear housing shell similar includes a rear wall 18 opposing and arranged substantially parallel to the front wall 16, wherein the rear wall 18 is spaced from the front wall 16 by the thickness direction of the housing 2. A plurality of transverse walls extends from a periphery of the rear wall 18 towards the front wall 16 with respect to the thickness direction of the housing 2 before similarly terminating at the seam 15. The plurality of transverse walls of the front housing shell 13 and the plurality of transverse walls of the rear housing shell 14 cooperate to form a plurality of connecting walls 21, 22, 23, 24 of the housing 2 for connecting the front wall 16 to the rear wall 18 about the entirety of the periphery of each of the opposing front and rear walls 16, 18. The connecting walls include an upper wall 21 disposed at the first end 11 of the housing 2, a lower wall 22 disposed at the second end 12 of the housing 2, a first lateral sidewall 23 formed at a first lateral side of the housing 2 with respect to a width direction of the housing 2, and a second lateral sidewall 24 formed at a second lateral side of the housing 2 opposite the first lateral side thereof. During use of the device 1, the upper wall 21 is generally configured to be arranged towards the surface of the body of water while the lower wall 22 is generally configured to be arranged towards the underlying ground surface.

In the provided embodiment, each of the disclosed walls 16, 18, 21, 22, 23, 24 includes a slightly convex shape with each of the edges formed between adjacent ones of the walls 16, 18, 21, 22, 23, 24 also having an arcuate and convex shape. The use of the convex shapes along each of the walls 16, 18, 21, 22, 23, 24 and at each transition between the walls 21, 22, 23, 24 facilitates an ease and comfort of handling of the device 1. The housing 2 may further be dimensioned to allow for the housing 2 to easily and comfortably be held in a single hand of the operator thereof to allow for the weight 4 and/or the line 5 to be drawn away from the housing 2 using the other hand of the operator not engaging the housing 2.

In the provided embodiment, the front housing shell 13 is coupled to the rear housing shell 14 via a plurality of fasteners 25 received through fastener openings formed in each of the respective shells 13, 14. The fasteners 25 are shown throughout as extending from the rear wall 18 towards the front wall 16 with respect to the thickness direction of the housing 2, but any configuration of the fasteners 25 may be provided for suitably coupling the opposing housing shells 13, 14 in a manner forming the interior compartment 3 to suitably house the necessary components for operating the device 1 as described hereinafter. The fasteners 25 may be threaded fasteners such as screws with at least a portion of the corresponding fastener openings formed within the front housing shell 13 being threaded to receive a corresponding threaded portion of each of the fasteners 25 in order to engage the housing shells 13, 14 to one another, but one skilled in the art should appreciate that any method of coupling the opposing housing shells 13, 14 may be employed while still remaining within the scope of the present invention, including the use of press-fit connectors, snap-fit connectors, interlocking connectors, or the like, as desired. The housing shells 13, 14 may also be formed from any suitably rigid materials capable of withstanding the forces encountered by the device 1 during use thereof. The rigid materials may be polymeric materials such as plastic, metallic materials, or composite materials, as desired. Any material capable of avoiding substantial deformation during a handling thereof that can also withstand being exposed to the conditions within the corresponding body of water may be utilized without necessarily departing from the scope of the present invention.

The upper wall 21 of the housing 2 includes an indentation 27 formed therein with the indentation 27 indented into the upper wall 21 in a direction towards the lower wall 22 of the housing 2. The indentation 27 may extend along the upper wall 21 from the front wall 16 to the rear wall 18 with respect to the thickness direction of the housing 2, as desired. A connecting shaft 28 extends in the width direction of the housing 2 between the opposing vertically arranged surfaces of the indentation 27 at a distance from a base of the indentation 27 to form an opening between the base of the indentation 27 and the connecting shaft 28.

As shown in FIG. 7, an independently provided connector or coupler 300 may be used to removably couple the device 1 to the corresponding waterfowl decoy 200. In the provided illustration, the waterfowl decoy 200 includes a decoy body 205 having the shape and configuration of the corresponding waterfowl (a duck as shown in FIG. 7) with the decoy body 205 configured to float on the associated body of water, a keel 210 configured to be disposed beneath the body of water, and a connecting piece 215 connecting the decoy body 205 to the keel 210 and also configured for being disposed beneath the surface of the body of water. The keel 210 is shown as including a pair of slotted openings 212 with each of the slotted openings 212 being substantially circular in shape with a relatively small portion of a circumference of each of the circular shapes intersecting a periphery of the keel 210 to form a relatively thin slot into each of the slotted openings 212. The connecting piece 215 includes a pair of through-openings 217 at opposing ends of the connecting piece 215.

The illustrated connector or coupler 300 includes a hooked or looped portion 302 at each of the longitudinal ends thereof. A first one of the hooked or looped portions 302 formed at a first end of the connector or coupler 300 is configured to be hooked or looped through any one of the slotted openings 212 or any one of the through-openings 217 associated with the waterfowl decoy 200. A second one of the hooked or looped portions 302 formed at a second end of the connector or coupler 300 is in turn configured to be hooked or looped through the opening formed between the base of the indentation 27 and the adjacent connecting shaft 28 to removably couple the connector or coupler 300 to each of the waterfowl decoy 200 and the device 1.

The use of the independently provided connector or coupler 300 advantageously allows for the device 1 to be configured for use with any of a variety of different waterfowl decoys 200 having substantially any desired pattern of the different openings 212, 217 at any locations thereon in addition to the exemplary positions shown and described. It should also be readily apparent to one skilled in the art that the illustrated connector of coupler 300 is merely exemplary in nature and may be replaced with any type of connector or coupler having the ability to loop through or otherwise hook to a corresponding feature of the waterfowl decoy 200 without departing from the scope of the present invention. For example, the connector or coupler 300 may be a rigid body having a releasable hooking or looping mechanism, a flexible body configured to be fed through or around the corresponding features of the waterfowl decoy 200, or any other similar coupling mechanism capable of cooperating with a portion of the waterfowl decoy 200, as desired.

Figure 10:
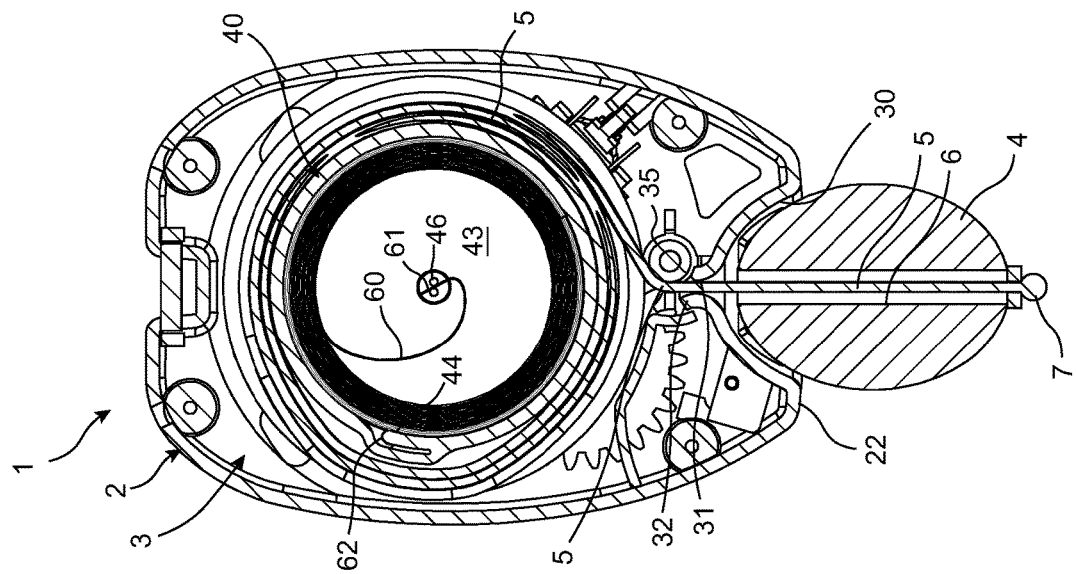
FIG. 10 is a cross-sectional elevational view of the weight retraction device as shown from the perspective of section lines 10-10 of FIG. 2.
Figure 8:
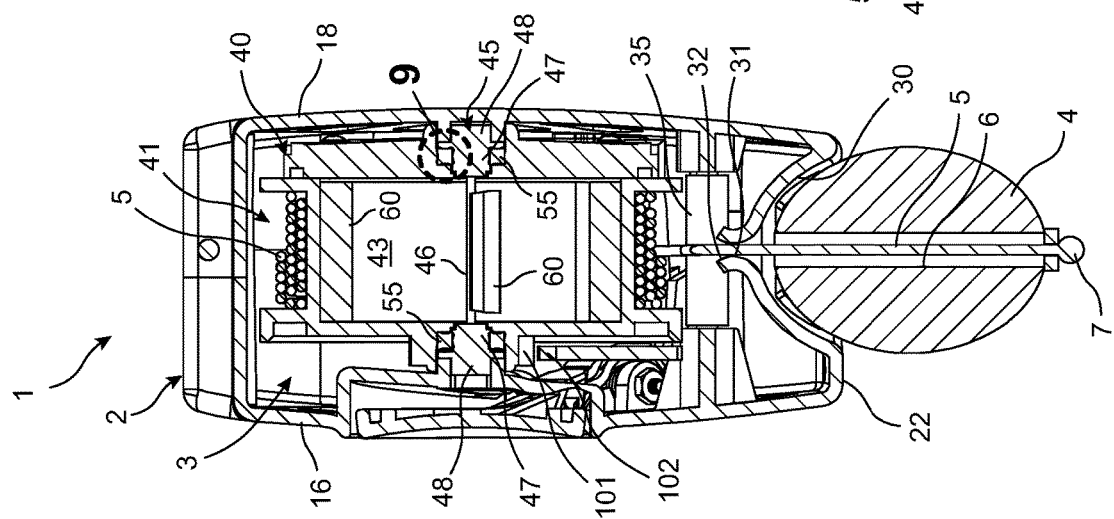
FIG. 8 is a cross-sectional elevational view of the weight retraction device as shown from the perspective of section lines 8-8 of FIG. 1.

As best shown in FIGS. 8 and 10, which show a cross-section directly through a center of the weight 4, the lower wall 22 of the housing 2 includes a weight receiving indentation 30 formed therein having a concave shape substantially corresponding to a shape of a convex shaped exterior portion of the weight 4. The weight receiving indentation 30 allows for the weight 4 to be disposed at a position that does not allow for substantial relative movement of the weight 4 when in the fully retracted position immediately adjacent the exterior of the housing 2. The motion restrictive position of the weight 4 within the weight receiving indentation 30 beneficially prevents situations where the weight 4 may swing or otherwise move relative to the housing 2 via the flexible line 5 in order to protect the hands of the operator from undesired contact with the weight 4 during handling of the device 1.

The weight 4 is shown as including an elongated spheroid shape with the line 5 extending through a central bore 6 formed through the longitudinal axis of the weight 4. The weight receiving indentation 30 formed in the housing 2 accordingly includes a complimentary partial spheroid shape to receive the weight 4 therein in the manner described above for allowing minimal lateral rotation or translation of the weight 4 when in the fully retracted position. The line 5 further includes an enlarged end portion 7 disposed outside of the central bore 6 at a distal end of the weight 4 with the enlarged end portion 7 having a larger diameter than the central bore 6 to avoid removal of the weight 4 from the line 5. In some embodiments, the enlarged end portion 7 may be further provided as a loop or ring structure (not shown) having an opening formed therethrough to allow for yet another one of the devices 1 to be coupled to the underside of the weight 4 of an above disposed one of the devices 1 under circumstances in which the depth of the water is beyond the length of the line 5 associated with either of the corresponding devices 1, as desired. One of the connectors or couplers 300 described hereinabove may be employed for coupling two of the devices 1 to one another in such a circumstance.

The weight 4 may be provided with shapes other from the spheroid shape shown and described herein, such as being purely spherical in shape, being semi-spherical in shape with a planar bottom surface arranged adjacent a plane of the lower wall 22 of the housing 2 when received in a corresponding semi-spherical weight receiving indentation 30, or semi-spherical in shape with a planar upper surface arranged to contact the lower wall 22 in the absence of the complimentary shaped weight receiving indentation 30, as desired. The weight 4 may also be formed from any non-buoyant material configured to sink when placed in the body of water, such as a suitable metallic material. In some embodiments, the metallic material may be lead, as one non-limiting example. The weight 4 may also be provided to include any suitable mass (and hence weight) for the desired application, such as being provided with weights such as 4 oz., 6 oz., 8 oz., 12 oz., or 1 lb., as desired. In some embodiments, the enlarged end portion 7 of the line 5 may also be removable to allow for the weight 4 to be removed from the line 5 via the central bore 6 thereof when it is desirable to replace the weight 4 with a more suitable mass for the given application, such as the use of a different waterfowl decoy 200 or the encountering of different conditions with respect to the associated body of water.

Referring still to FIGS. 8 and 10, the line 5 extends through a line opening 31 formed through the lower wall 22 of the housing 2 at an upper indented end of the weight receiving indentation 30 to allow the line 5 to pass between the interior compartment 3 of the housing 2 and the exterior of the housing 2 when it is desired to extend the weight 2 away from or to retract the weight 4 back towards the housing 2. The line opening 31 includes a cross-sectional shape and size substantially corresponding to that of the line 5 to prevent an undesired degree of play in the line 5 such that the line 5 is extended or retracted primarily in the longitudinal direction of the housing 2 during the extension or retraction of the weight 4. The lower wall 22 of the housing 2 further includes a radially outwardly tapering mouth 32 immediately adjacent the line opening 31 towards the interior compartment 3 of the housing 2 with an inner surface of the mouth 32 having a substantially convex shape about a circumferential direction thereof. The radial outward tapering and the convex shape of the inner surface of the mouth 32 permits for the portion of the line 5 disposed immediately inward of the line opening 31 within the interior compartment 3 to be disposed at variable angles relative to the line opening 31 as occurs during a winding or an unwinding of the line 5 as explained in greater detail hereinafter. The presence of the mouth 32 thereby prevents the generation of an undesirably high tension formed within the line 5 during the extension or retraction thereof as would be the case if the line 5 were placed at an undesirably large angle while progressively passing over an edge of the mouth 32.

The manner in which the line 5 is extended or retracted through the line opening 31 necessarily leads to the ingress of water into the interior compartment 3 of the housing 2, thereby wetting various components present within the interior compartment 3 during a submerging of the device 1 within the corresponding body of water. In order to mitigate against the effects of such water present within the interior compartment 3 during periods of non-use of the device 1, such as a freezing of the water within the interior compartment 3 when the device 1 is exposed to especially cold ambient temperatures, the housing 2 further includes a plurality of drainage openings 33 formed therein (FIGS. 1 and 3) with each of the drainage openings 33 providing fluid communication between the interior compartment 3 of the housing 2 and the exterior thereof. Specifically, in the provided embodiment, the housing 2 includes a first annular array of the drainage openings 33 formed within the front wall 16 as well as a second annular array of the drainage openings 33 formed within the rear wall 18. The drainage openings 33 not only allow for the drainage of the water from the interior compartment 3, but also allow for air to subsequently circulate through the interior compartment 3 to aid in the process of allowing the components disposed within the interior compartment 3 to quickly dry when the device 1 is not in use, such as when the device 1 is removed from the associated body of water. The drainage openings 33 are provided to be relatively small so as to avoid the entry of debris that could compromise the operation of the components disposed within the interior compartment 3 as well as to prevent the fingers of the operator from accidentally entering the interior compartment 3. Additionally, each of the drain openings 33 may further include a corresponding screen element or other filtering element extending thereacross to further prevent the ingress of even smaller debris while still allowing the aforementioned drainage and air circulation.

Figure 9:
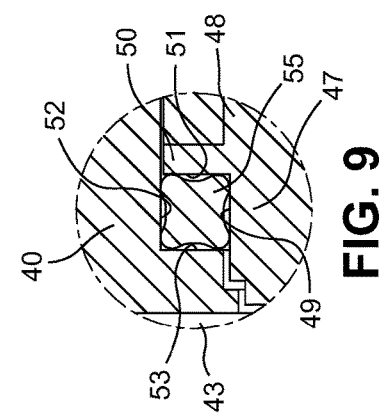
FIG. 9 is an enlarged fragmentary cross-sectional view of the portion of the weight retraction device encircled in circle 9 of FIG. 8 showing a multi-lobed sealing element thereof.

As best shown in FIGS. 8-10, the device 1 includes a spool 40 that is rotatably coupled to the housing 2 and disposed within the interior compartment 3 thereof. The spool 40 includes an annular line receiving opening 41 within which the line 5 may be wound or unwound during the extension or retraction of the line 5. The line receiving opening 41 includes a sufficient radial depth for allowing the line 5 to be wound about the spool 40 in accordance with a length of the corresponding line 5. One end of the line 5 opposite the weight 4 is securely coupled to the spool 40 along a circumferential surface thereof defining a radially inner surface of the line receiving opening 41 in a manner wherein rotation of the spool 40 in a first rotational direction causes the line 5 to be unwound from the spool 40 while rotation in an opposing second rotational direction causes the line 5 to be wound back onto the spool 40. The unwinding of the line 5 from the spool 40 occurs while the weight 4 is being pulled away from the housing 2 and the winding of the line 5 back onto the spool 40 occurs when the weight 4 is being retracted back towards the housing 2. As mentioned above, the mouth 32 formed adjacent the line opening 31 allows for the line 5 to be extended or retracted through the line opening 31 at a plurality of different angles from the perspective of FIG. 8 due to the manner in which the line receiving opening 41 of the spool 40 extends a distance in the thickness direction of the housing 2 arranged parallel to an axis of rotation of the spool 40.

The device 1 further includes a cylindrical line directing rod 35 disposed immediately adjacent the mouth 32 and extending between the front wall 16 and the rear wall 18 of the housing 2. The line directing rod 35 includes a portion of an outer circumferential surface thereof arranged parallel to the longitudinal direction of the housing 2 at a position disposed immediately above the line opening 8 as can best be seen in FIG. 10. This aids in directing the line 5 to be arranged tangential to the line directing rod 35 and parallel to a direction of passage of the line 5 through the line opening 31 when the line 5 is being wound or unwound from the spool 40. In some embodiments, the line directing rod 35 may be a cylinder fixed in position while in other embodiments the line directing rod 35 may be rotatably disposed between the opposing walls 16, 18 to cause the line directing rod 35 to spin as the line 5 passes thereover. The spinning of the line directing rod 35 may aid in reducing the friction encountered by the line 5 when passing thereover, thereby reducing the amount of force needed to wind or unwind the line 5 onto the spool 40.

The spool 40 is configured to rotate around a fixed axle 45 extending longitudinally in the thickness direction of the housing 2 between the front wall 16 and the rear wall 18 with the fixed axle 45 defining the axis of rotation of the spool 40. The fixed axle 45 includes a central portion 46 disposed within an interior opening 43 of the spool 40, a pair of cylindrical portions 47 disposed axially outwardly of and straddling the central portion 46 at positions outside of the interior opening 43 of the spool 40, and a pair of securing portions 48 disposed axially outwardly of and straddling the cylindrical portions 47. Each of the securing portions 48 may include a non-cylindrical cross-section, such as a square cross-section, that is received within a correspondingly cross-sectioned opening formed in the engaging one of the front or rear walls 16, 18 to prevent a transfer of the rotation of the spool 40 to the fixed axle 45.

As best shown in FIG. 9, each of the axial end portions of the spool 40 includes an inner circumferential surface 52 surrounding and facing towards an outer circumferential surface 49 of the corresponding one of the cylindrical portions 47 of the fixed axle 45. An annular sealing element 55 is disposed between each of the inner circumferential surfaces 52 of the spool 40 and the corresponding outer circumferential surface 49 of the radially aligned one of the cylindrical portions 47 of the fixed axle 45. The fixed axle 45 may further include a radially outwardly extending and annularly extending wall 50 formed between each of the cylindrical portions 47 and the adjacent one of the securing portions 48 with each of the walls 50 disposed to an axially outer side of the annular sealing element 55 with respect to the axis of rotation of the spool 40. Each of the annular walls 50 includes a radially extending surface 51 facing towards the corresponding one of the annular sealing elements 55. Additionally, each of the axial end portions of the spool 40 further includes a radially inwardly extending surface 53 disposed to an axially inner side of the annular sealing element 55 with respect to the axis of rotation of the spool 40. This results in each of the annular sealing elements 55 being boxed by four different surfaces about a circumference of each of the annular sealing elements 55.

Each of the annular sealing elements 55 is provided as a four-lobed sealing element with each of the four lobes extending generally towards one of the corners of the boxed shape formed by the above described cooperation of the various surfaces 49, 51, 52, 53. This configuration results in each of the four lobes contacting two of the perpendicular arranged surfaces 49, 51, 52, 53 at each of the corners of the boxed shape formed by the surfaces 49, 51, 52, 53.

The spool 40 is configured to rotate relative to the fixed axle 45 via contact with each of the annular sealing elements 55 about a circumference of each of the annular sealing elements 55 during an extension or a retraction of the weight 4 relative to the housing 2. The annular sealing elements 55 are also configured to prevent the ingress of water disposed within the remainder of the interior compartment 3 of the housing 2 into the interior opening 43 of the spool 40 due to the presence of each of the annular sealing elements 55 at each of the junctures between the spool 40 and the fixed axle 45.

The use of the four-lobed annular sealing elements 55 accordingly provides numerous advantages in comparison to a more traditional circular sectioned O-ring or the like. Specifically, as shown in FIG. 9, any water attempting to enter the interior opening 43 of the spool 40 has to pass by four different engaging portions of each of the annular sealing elements 55 when attempting to pass around the corresponding annular sealing element 55 adjacent either of the spool 40 or the fixed axle 45, thereby improving the sealing effect of each of the annular sealing elements 55. Additionally, the unique shape of each of the annular sealing elements 55 also leads to each of the points of contact between the stationary annular sealing elements 55 and the rotating spool 40 being relatively small in surface area due to the manner in which the lobes are substantially pointed and the portions of each of the annular sealing elements between the lobes are not in direct contact with the spool 40 during rotation thereof. This reduces the frictional forces present between the spool 40 and each of the annular sealing elements 55, which in turn prevents a seizing of the spool 40 when being wound or unwound during the extension or retraction of the weight 4 while also reducing the amount of torque required to rotate the spool 40 relative to the fixed axle 45.

As best shown in FIG. 10, the interior opening 43 of the spool 40 includes a power spring 60 disposed therein, which may alternatively be referred to as a flat spring or a clock spring, as desired. The power spring 60 includes a fixed end 61 securely coupled to the central portion 46 of the fixed axle 45 and an orbiting end 62 securely coupled to an inner circumferential surface 44 of the spool 40. The power spring 60 is provided as a coiled piece of metallic material that is biased to normally urge the spool 40 in a rotational direction for retracting the weight 4 towards the housing 2 and winding the line 5 around the spool 40. Additionally, the power spring 60 is further configured such that the torque generated by the power spring 60 increases as the power spring 60 is wound more tightly around the fixed axle 45 during rotation of the spool 40 in the first rotational direction corresponding to the weight 4 being extended away from the housing 2 and the line 5 being unwound from the spool 40, thereby increasing the bias of the power spring 60 to retract the weight 4 back towards the housing 2. The annular sealing elements 55 are provided to prevent water from interfering with the operation of the power spring 60 as the presence of water between the windings of the power spring 60 could affect the ability of the power spring 60 to wind or unwind itself properly during the extension or retraction of the weight 4 relative to the housing 2.

The configuration of the power spring 60 beneficially provides a safety feature wherein the speed at which the weight 4 is retracted towards the housing 2, and hence the hands of the operator, actually decreases as the weight 4 approaches the housing 2. This occurs both because the torque generated by the winding of the power spring 60 is lessened as the power spring 60 is unwound back towards its initial position and because the frictional forces present between the different windings of the power spring 60 tend to increase when the power spring 60 returns to the position corresponding to the full retraction of the weight 4 towards the housing 2.

Referring now to FIGS. 11-17, a lock release mechanism 65 of the device 1 is disclosed. The device 1 is normally configured to lock the position of the line 5 and the corresponding weight 4 absent the manual intervention of the operator in order to prevent the undesired extension or retraction of the weight 4 away from or towards the housing 2. This locking feature may be helpful in preventing the weight 4 from being extended or retracted to an undesired distance from the housing 2 during the submerging of the device within the associated body of water as well as preventing the weight 4 from rapidly approaching the hands of the operator in an undesired manner that could cause injury to the operator during handling of the device 1. The lock release mechanism 65 is also configured to allow for the weight 4 and/or the line 5 to be manually pulled away from the housing 2 when the lock release mechanism 65 is in the otherwise locked configuration. The lock release mechanism 65 is further configured to allow for the automatic retraction of the weight 4 and the corresponding portion of the line 5 towards the housing 2 during manual actuation of the lock release mechanism 65 as the result of the torque generated by the power spring 60 as described hereinabove.

The lock release mechanism 65 includes a push-button actuator 66 disposed at the front wall 16 of the housing 2. Referring back briefly to FIG. 1, the push-button actuator 66 may include a substantially circular profile shape extending across approximately half of the width of the front wall 16 and approximately a third of the length of the front wall 16. The push-button actuator 66 is provided to include a relatively large size to allow for the operator to quickly and easily feel the presence of the push-button actuator 66 when releasing the locked position of the weight 4 for retracting the weight 4 back towards the housing 2, and especially under low light conditions. The push-button actuator 66 is also ergonomically positioned in a manner wherein the hand of the operator can easily fit around the housing 2 with the thumb of the corresponding hand positioned over the push-button actuator 66 to allow the other hand of the operator to be free for activities such as handling the weight 4 and/or line 5. The push-button actuator 66 also includes a substantially concave surface 67 exposed to the operator to differentiate the push-button actuator 66 easily from the remainder of the substantially convex shaped surfaces of the exterior of the housing 2 including the front wall 16 thereof.

Figure 12:
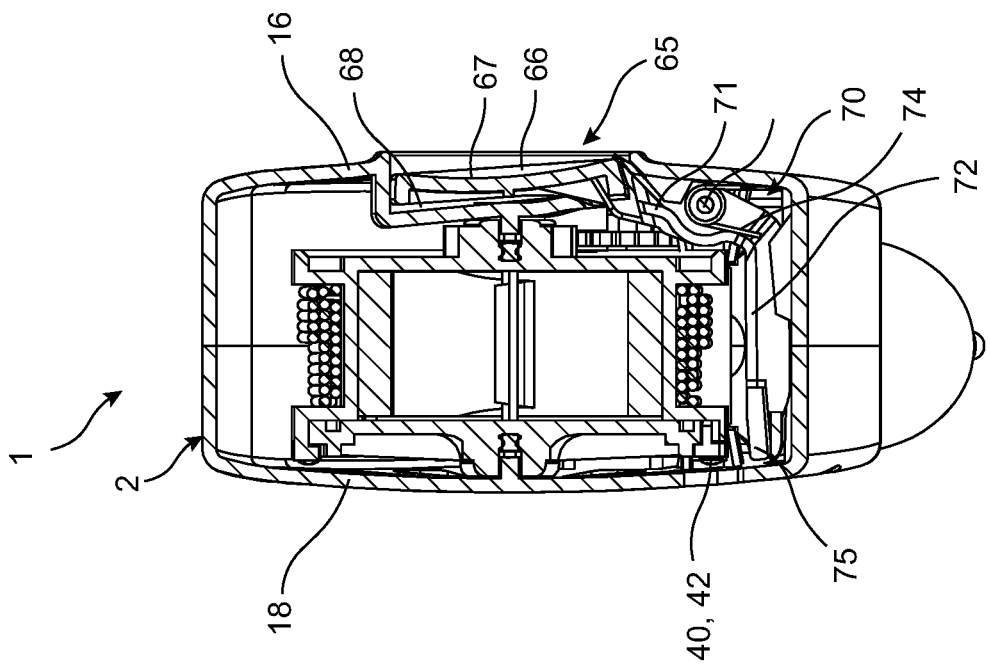
FIG. 12 is a cross-sectional view of the weight retraction device from the same perspective as FIG. 11, wherein the lock release mechanism is in a manually actuated position.
Figure 11:
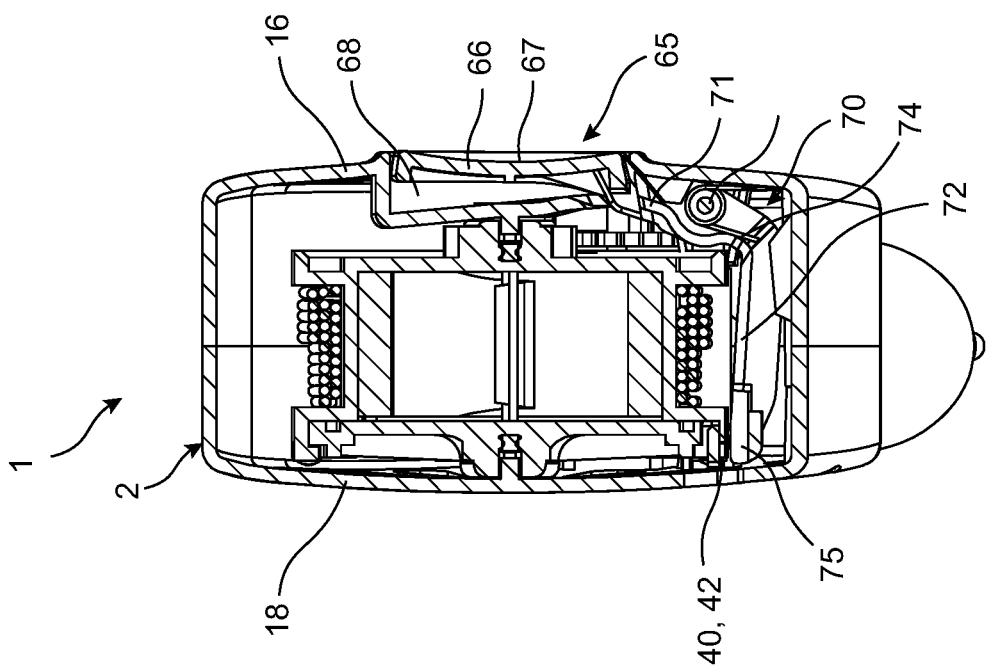
FIG. 11 is a cross-sectional view of the weight retraction device as shown from the perspective of section lines 11-11 of FIG. 1, wherein a lock release mechanism of the weight retraction device is in a non-actuated configuration.

The push-button actuator 66 is disposed within an actuator opening 68 that both surrounds the push-button actuator 66 (FIG. 1) and includes a depth in the thickness direction of the housing 2 to allow for the push-button actuator 66 to be pressed inwardly relative to the remainder of the front wall 16 of the housing 2 (FIGS. 11 and 12). The actuator opening 68 may be aligned with the axis of rotation of the spool 40 as formed by the fixed axle 45 thereof as is apparent from review of FIGS. 11 and 12.

The push-button actuator 66 forms a first end portion of a lever structure 70 of the lock release mechanism 65. The lever structure 70 includes a first lever arm 71 securely and rigidly coupled to a second lever arm 72 with the lever arms 71, 72 configured to pivot about a pivot axis 73 (fulcrum) of the lever structure 70. The push-button actuator 66 is securely and rigidly coupled to the first lever arm 71 in a manner wherein an inward pressing of the push-button actuator 66 causes both of the lever arms 71, 72 to rotate about the pivot axis 73 in unison. The pivot axis 73 may be provided by a cylindrical rod or shaft disposed through the lever structure 70 at the junction of the two lever arms 71, 72. The lever structure 70 is coupled to a torsion spring 74 at the pivot axis 73 with the torsion spring 74 configured to urge the lever arms 71, 72 and hence the push-button actuator 66 to the non-pressed configuration of the push-button actuator 66 (FIG. 11) wherein the perimeter of the concave surface 67 of the push-button actuator 66 is arranged immediately adjacent the surrounding portions of the front wall 16. An inward pressing of the push-button actuator 66 (FIG. 12) is accordingly performed against the urging of the torsion spring 74 to cause the pivoting of the lever structure 70 about the pivot axis 73.

The first lever arm 71 and a portion of the second lever arm 72 extend in a radial direction of the spool 40 as defined by the axis of rotation thereof. The torsion spring 74 and the pivot axis 73 may be coupled to the front wall 16 of the housing 2 at a position allowing for a rearwardly extending portion of the second lever arm 72 to wrap around the outer periphery of the spool 40. A rearwardly disposed second end portion 75 of the lever structure 70 formed by a distal end of the second lever arm 72 is disposed adjacent the rear wall 18 of the housing 2 adjacent a rear surface 42 of the spool.

As can be seen by a comparison between FIGS. 11 and 12, the inward pressing of the push-button actuator 66 causes the pivoting of the lever structure 70 (in the counter-clockwise direction from the illustrated perspective) against the urging of the torsion spring 74. This rotational motion causes the second end portion 75 of the lever structure 70 as formed by the distal end of the second lever arm 72 to move radially outwardly away from the periphery of the spool 40 as shown in FIG. 12. A discontinuation of the pressing of the push-button actuator 66 in turn allows for the torsion spring 74 to return the lever structure 70 to the position of FIG. 11 wherein the second end portion 75 of the lever structure 70 is once again moved radially inwardly back towards the periphery of the spool 40.

Referring now to FIGS. 13-17, a ratcheting mechanism 80 forming a portion of the lock release mechanism 65 is disclosed. FIGS. 13-17 illustrate the housing 2 in cross-section from a position adjacent the rear wall 18 of the housing 2 and at a perspective towards the front wall 16 thereof to show the rear surface 42 of the spool 40 in its entirety. The rear surface 42 of the spool 40 forms a ratchet structure 81 including a plurality of ratchet teeth 82 circumferentially spaced about a periphery of the rear surface 42 of the spool 40. Each of the ratchet teeth 82 includes an inclined surface 83 arranged at an angle relative to the radial direction of the spool 40, a convexly shaped curved surface 84 formed opposite the inclined surface 83, and a tangential surface 85 arranged tangentially to the periphery of the rear surface 42 of the spool 40 at the position of each of the ratchet teeth 82 and connecting the inclined surface 83 to the curved surface 84. The illustrated embodiment includes four of the ratchet teeth 82 spaced 90 degrees from each other with respect to the circumferential direction, but one skilled in the art should appreciate that any number of the ratchet teeth 82 may be utilized without significantly changing the operation of the ratcheting mechanism 80. The number and spacing between the ratchet teeth 82 may affect the amount of resistance provided by the spool 40 during a hand extension of the line 5 and the weight 4 away from the housing 2 as well as a distance the weight 4 travels when being retracted back towards the housing 2 before the lock release mechanism 65 reaches the next locked configuration, as explained in greater detail hereinafter.

The ratcheting mechanism 80 further includes a pawl 90 configured to interact with each of the ratchet teeth 82 of the ratchet structure 81 of the spool 40 for placing the lock release mechanism 65 in the locked configuration. The pawl 90 includes a spring element 91 and a pawl body 92. The spring element 91 is shown as a resilient strip of material including a first end 93 securely coupled to the first sidewall 23 of the housing 2 and an opposing second end 94 coupled to the pawl body 92. The spring element 91 is configured to normally urge the pawl body 92 in a radially inward direction of the spool 40 towards the axis of rotation thereof.

The pawl body 92 includes an inclined surface 95 arranged at an angle relative to the radial direction of the spool 40, a convexly shaped curved surface 96 intersecting the inclined surface 95 at a radially innermost portion of the pawl body 92, and a lever engaging portion 97 extending in the radially outward direction of the spool 40 over a surface of the second end portion 75 of the lever structure 70. The inclined surface 95 of the pawl body 92 is formed to be complimentary to the inclined surface 83 of each of the ratchet teeth 82 when the corresponding one of the ratchet teeth 82 is rotated to the position of the pawl body 92.

Figure 13:
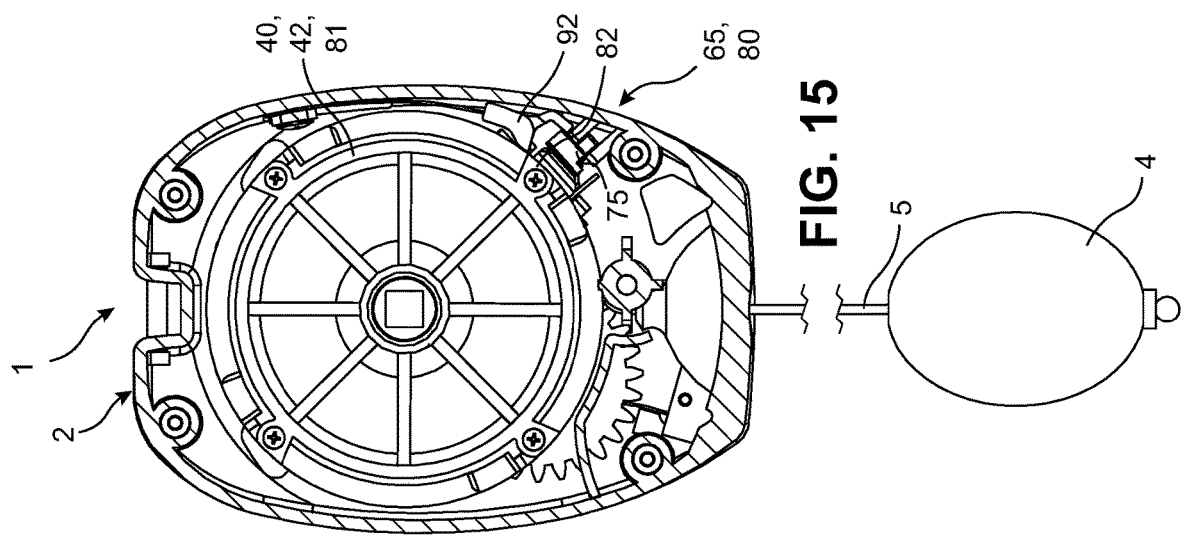
FIG. 13 is a cross-sectional elevational view of the weight retraction device as shown from the perspective of section lines 13-13 in FIG. 2, wherein a pawl of the weight retraction device is in a locked position with the weight of the weight retraction device disposed in a fully retracted position relative to the housing of the weight retraction device.

As can be seen in FIG. 13, the second end portion 75 of the lever structure 70 includes a guide extension 77 slidably disposed within a guide slot 78 formed by a portion of the housing 2 extending from the first sidewall 23 thereof. The guide slot 78 is configured to maintain the pivoting of the lever structure 70 along the desired plane in response to the inward pressing of the push-button actuator 66, thereby ensuring the desired contact between the second end portion 75 of the lever structure 70 and the lever engaging portion 97 of the pawl body 92.

The ratcheting mechanism 80 of the lock release mechanism 65 operates as follows with reference to FIGS. 13-17. FIG. 13 illustrates the device 1 when the weight 4 is fully retracted towards the housing 2 with the lock release mechanism 65 in the locked configuration thereof as a result of the pawl body 92 being urged to a position by the spring element 91 wherein the inclined surface 95 of the pawl body 92 engages the inclined surface 83 of one of the ratchet teeth 82. Regardless of the configuration of the lock release mechanism 65 and the ratcheting mechanism 80, the full retraction of the weight 4 to a position within the weight receiving indentation 30 prevents rotation of the spool 40 due to the interference between the weight 4 and the housing 2.

Figure 14:
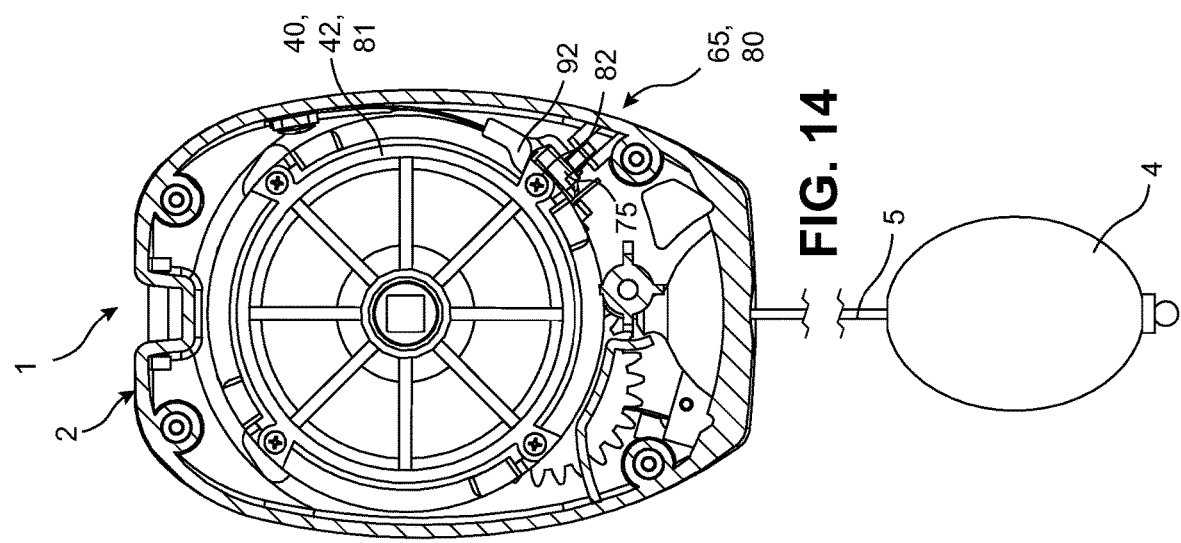
FIG. 14 is a fragmentary cross-sectional elevational view of the weight retraction device from the same perspective as FIG. 13, wherein the pawl is in the locked position with the weight extended away from the housing of the weight retraction device.

In contrast, FIG. 14 illustrates the device 1 after the weight 4 has been extended a distance away from the housing 2 to cause at least a portion of the line 5 to be unwound from the spool 40. The lock release mechanism 65 is once again in the locked configuration thereof as a result of the pawl body 92 being urged to a position by the spring element 91 wherein the inclined surface 95 of the pawl body 92 engages the inclined surface 83 of one of the ratchet teeth 82. The engagement between the pawl body 92 and the corresponding one of the ratchet teeth 82 prevents the spool 40 from rotating in the second rotational direction thereof corresponding to the retraction of the weight 4 back towards the housing 2 and the rewinding of the line 5 around the spool 40, despite the urging of the power spring 60 to cause the rotation of the spool 40 in the second rotational direction.

Figure 15:
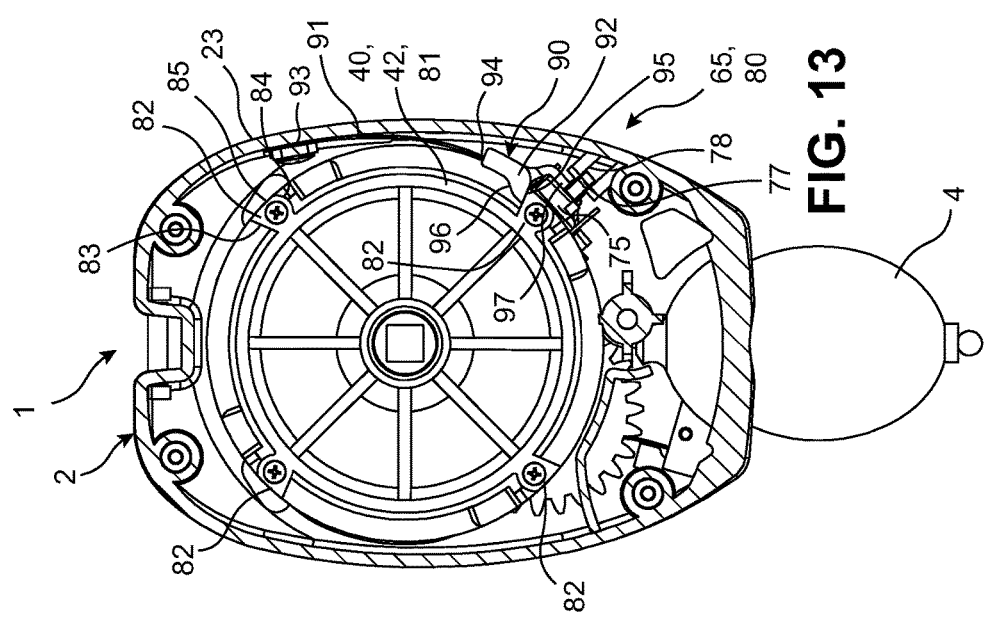
FIG. 15 is a fragmentary cross-sectional elevational view of the weight retraction device from the same perspective as FIG. 13, wherein the pawl is in a released position for allowing a retraction of the weight towards the housing of the weight retraction device.

FIG. 15 illustrates the second end portion 75 of the lever structure 70 as being pivoted radially outwardly away from the periphery of the spool 40 via the inward pressing of the push-button actuator 66 disposed at the first end portion of the lever structure 70 (shown in FIG. 12). The radial outward motion of the second end portion 75 causes the lever engaging portion 97 of the pawl body 92 and hence the entirety of the pawl body 92 to similarly be pressed radially outwardly away from the corresponding one of the ratchet teeth 82 against the urging of the spring element 91 to cause the complimentary inclined surfaces 83, 95 to disengage. The configuration of FIG. 15 accordingly corresponds to a released configuration of the lock release mechanism 65 wherein the urging of the power spring 60 causes the spool 40 to rotate in the second rotational direction for retracting the weight 4 and rewinding the line 5 onto the spool 40. The passage of the pawl body 92 over the tangential surface 85 of the corresponding one of the ratchet teeth 82 is shown in FIG. 16 wherein the spool 40 has begun rotation in the second rotational direction relative to the configuration shown in FIG. 15.

The configuration of the lock release mechanism 65 and the ratcheting mechanism 80 shown in FIGS. 15 and 16 may also be utilized by the operator of the device 1 to aid in pulling out the line 5 to extend the weight 4 by reducing the interaction between the spool 40 and the ratcheting structure 81 as a result of the inward pressing of the press-button actuator 66, as desired. The pulling out of the line 5 includes the rotation of the spool 40 in the first rotational direction wherein the pawl body 92 and each of the ratchet teeth 82 do not interact with each other.

Finally, FIG. 17 shows the lock release mechanism 65 and the ratcheting mechanism 80 when the inward pressing of the push-button actuator 66 has once again been ceased by the operator. The pawl body 92 is once again urged radially inwardly towards the spool 40 by the spring element 91 to reposition the inclined surface 95 of the pawl body 92 to eventually engage the inclined surface 83 of a subsequent one of the ratchet teeth 82 following a minor rotation of the spool 40 in the second rotational direction thereof of less than the 90 degrees of rotational separation between adjacent ones of the ratchet teeth 82.

As is most apparent with review of FIG. 17, the ratcheting mechanism 80 does not prevent rotation of the spool 40 in the first rotational direction corresponding to the weight 4 being extended away from the housing 2 and the line 5 being unwound from the spool 40 even when the push-button actuator 66 is not pressed inwardly. This occurs because the curved surface 96 of the pawl body 92 is facing towards the curved surface 84 of each of the ratchet teeth 82 as each of the ratchet teeth 82 orbit during rotation of the spool 40 in the first rotational direction. The curved surfaces 84, 96 are shaped to allow for the pulling on the weight 4 and/or line 5 to overcome the spring force supplied by the spring element 91 to allow for the pawl body 92 to pass over each of the subsequently passing ratchet teeth 82. As such, the spool 40 is capable of rotation in the first rotational direction thereof during the letting out of the line 5 even when the lock release mechanism 65 is otherwise placed in the locked configuration thereof.

FIGS. 18-22 illustrate a distance indicating mechanism 100 forming a portion of the device 1 for determining what length of the line 5 has been extended away from the housing 2 as well as what length of the line 5 has been retracted back towards the housing 2 following a previous extension of the weight 4 away from the housing 2. The distance indicating mechanism 100 operates by making an audible clicking noise each time a specified distance of the line 5 has been fed through the line opening 31 by reference to the degree of rotation undergone by the spool 40 during the process of letting out the line 5 or retracting the line 5.

The distance indicating mechanism 100 includes a first gear 101, a second gear 102, and a resilient strip 103. The first gear 101 forms a portion of the spool 40 surrounding the end of the fixed axle 45 disposed axially towards the front wall 16 of the housing 2. The first gear 101 includes the same axis of rotation as the spool 40 due to the integral formation of the first gear 101 with the spool 40. As such, any rotation of the spool 40 directly corresponds to an equivalent degree of rotation of the first gear 101. The second gear 102 is rotatably mounted to the housing 2 with an axis of rotation thereof spaced from the axis of rotation of the first gear 101. The second gear 102 may be rotatably mounted to the front wall 16 of the housing 2, as desired. The first gear 101 and the second gear 102 are configured to operably engage each other via the corresponding teeth thereof. The first gear 101 and the second gear 102 may each include a desired diameter and number of teeth to establish a desired gear ratio between the first gear 101 and the second gear 102. The second gear 102 is accordingly driven to rotate through a desired degree of rotation in accordance with the corresponding degree of rotation of the spool 40 as established by the gear ratio present between the gears 101, 102.

The resilient strip 103 includes a fixed portion 104 and an outwardly extending portion 105 terminating at a free end 106. In the illustrated embodiment, the fixed portion 104 of the resilient strip 103 is formed by a bent end portion of the resilient strip 103 coupled to the housing 2 adjacent the lower wall 22 thereof, but the fixed portion 104 may be coupled to any portion of the housing 2 without necessarily departing from the scope of the present invention. The outwardly extending portion 105 initially points substantially towards the axis of rotation of the second gear 102 before curving to one side thereof as the outwardly extending portion 105 extends from the fixed portion 104 towards the free end 106. The resilient strip 103 is formed from a resilient material configured to spring back to its original position following a flexing thereof away from the configuration shown in FIG. 18. The act of the resilient strip 103 springing back to the original position thereof is what creates the audible clicking sound indicating the amount of the line 5 that has been extended or retracted relative to the housing 2.

The second gear 102 includes a projection 108 projecting from a face of the second gear 102 in a direction parallel to and at a position spaced from the axis of rotation thereof. The projection 108 is positioned to encounter the free end 106 of the resilient strip 103 with regards to a limited range of rotational positions of the second gear 102 to cause the flexing and subsequent springing back of the resilient strip 103 for causing the audible sound mentioned above. The projection 108 further includes a perimeter shape for interacting with the free end 106 of the resilient strip 103 in a manner causing the free end 106 to disengage from the projection 108 differently depending on the direction of rotation of the spool 40 and hence the corresponding direction of rotation of the second gear 102.

Depending on the configuration of the components forming the distance indicating mechanism 100, the clicking sound generated by the resilient strip 103 occurs periodically with each of the clicks generated corresponding to a certain degree of rotation of the spool 40 in either of the corresponding rotational directions. The degree of rotation of the spool 40 in turn corresponds to a certain length of the line 5 having been wound onto or off of the spool 40. The clicking sound may be generated with respect to a regular distance interval of the line 5 extension, such one click corresponding to one foot of extension of the line 5, to allow the operator to know approximately how many feet of the line 5 have been let out of the device 1 to allow for the weight 4 to reach the ground surface associated with the body of water in which the device 1 is being used. The click is also evident when retracting the line 5 for the same distance interval to allow for adjustments of the line 5 length regardless of whether the line 5 is extended or retracted.

Figure 21:
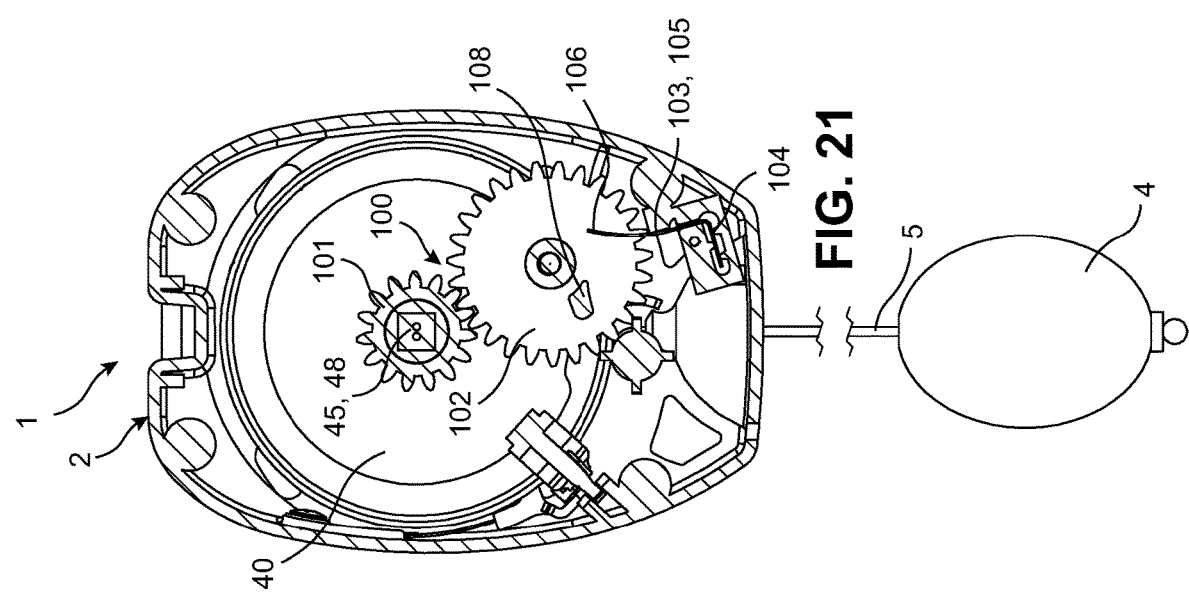
FIG. 21 is a fragmentary cross-sectional elevational view of the weight retraction device from the same perspective as FIG. 18, wherein the resilient strip of the distance indicating mechanism has recoiled back to the non-engaging configuration following continued extension of the weight away from the housing of the weight retraction device.

The distance indicating mechanism 100 is shown as progressing through the various positions associated with the weight 4 being extended away from the housing 2 and the line 5 being unwound from the spool 40 with reference to FIGS. 18-21. FIG. 18 shows the projection 108 approaching the free end 106 of the resilient strip 103 with the outwardly extending portion 105 of the resilient strip 103 curving in a direction towards the projection 108. In FIG. 19, the projection 108 has continued to orbit to a position initially contacting the free end of the resilient strip 103. FIG. 20 shows the resilient strip 103 having orbited via continued rotation of the spool 40 and hence the second gear 102 to a position wherein the free end 106 is barely in contact with the projection 108 and the resilient strip 103 is flexed to a maximum extent away from the original position thereof shown in FIG. 18. Finally, FIG. 21 shows the projection 108 having orbited to a position where the free end 106 of the resilient strip 103 has disengaged from the projection 108 to cause the resilient strip 103 to resiliently spring back to the original position of FIG. 18. As noted above, this springing back of the resilient strip 103 causes an audible clicking sound to be apparent to the operator of the device 1.

Figure 22:
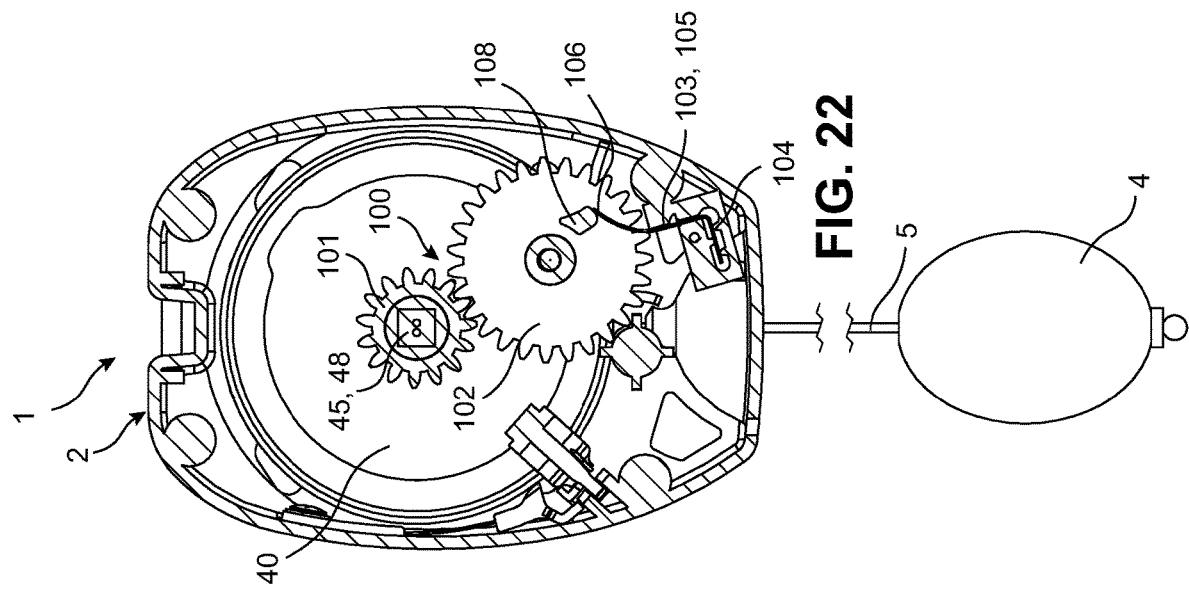
FIG. 22 is a fragmentary cross-sectional elevational view of the weight retraction device from the same perspective as FIG. 18, wherein the resilient strip of the distance indicating mechanism is in an initial engaging position during a retraction of the weight back towards the housing of the weight retraction device.

In contrast, a comparison of FIG. 21 to FIG. 22 shows the reaction of the resilient strip 103 when the spool 40 is rotated in a direction corresponding to the weight 4 being retracted back towards the housing 2 with the line 5 winding back around the spool 40. The curvature of the outwardly extending portion 105 of the resilient strip 103 to one side causes the free end 106 thereof to be only slightly displaced from the original position thereof as shown in FIG. 21 when reaching the flexed position of FIG. 22. As a result, the resultant spring back effect of the resilient strip 103 following the disengagement of the free end 106 thereof from the projection 108 is smaller and hence a smaller clicking sound is audible to the operator during the retraction of the weight 4 and the winding of the line 5 around the spool 40.

The distance indicating mechanism 100 accordingly makes a clicking noise having a distinctly different loudness depending on the direction of rotation of the spool 40 with the pulling out of the line 5 for establishing a depth of the weight 4 within the body of water being louder to aid the operator in determining a length of the line 5 let out when trying to match the depth of the associated body of water. In contrast, the retraction process is typically performed primarily in order to retrieve the weight 4, hence there is a decreased need to know how many feet of the line 5 have been retracted.

Figure 23:
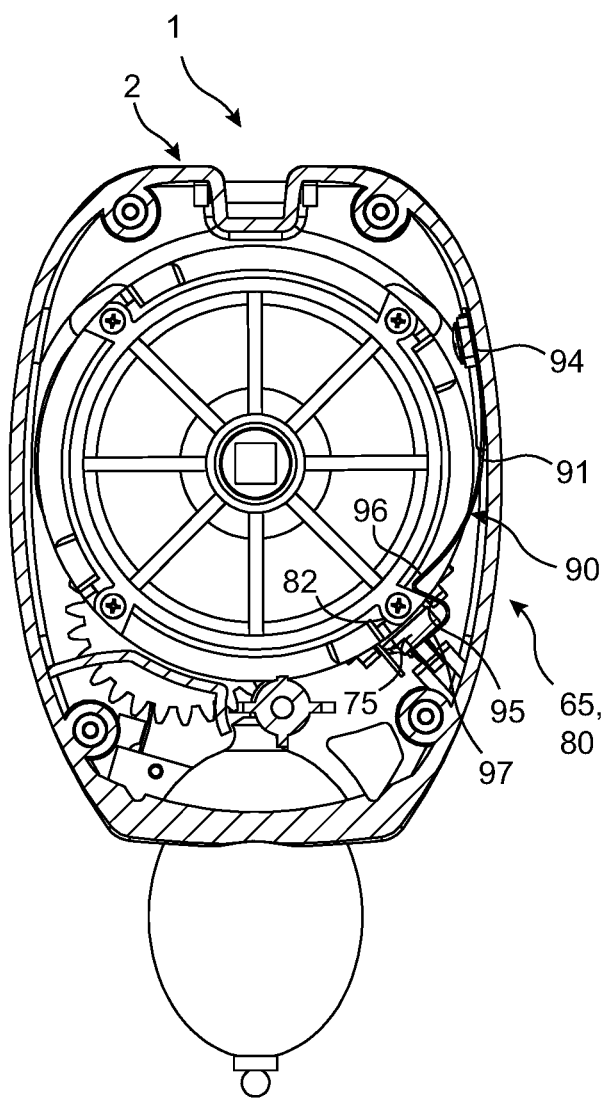
FIG. 23 is a fragmentary cross-sectional elevational view of a weight retraction device according to another embodiment of the invention as shown from the same perspective as FIG. 13 with respect to the first embodiment of the invention, wherein the weight retraction device includes a modified pawl configuration formed from a bent strip of material.

Referring now to FIG. 23, a modification to the pawl 90 of the ratcheting mechanism 80 is disclosed according to another possible embodiment of the present invention. The ratcheting mechanism 80 and the associated lock release mechanism 80 operate identically to that disclosed in FIGS. 13-17, but the pawl 90 is formed entirely from the same strip of material forming the spring element 91 of the pawl 90 of FIGS. 13-17. The strip of material is merely bent to form each of the inclined surface 95 thereof, the intersecting curved surface 96 thereof, and the lever engaging portion 97 thereof extending over the second end portion 75 of the lever structure 70. The use of the modified pawl 90 of FIG. 23 according simplifies the construction of the device 1 by removing the need to couple the pawl body 92 to the spring element 91 of the pawl 90.

As described throughout, the device 1 offers numerous advantageous features. The housing 2 is easy to handle with the push-button actuator 66 being easy to find and press inwardly. The device 1 can be easily adapted for coupling to any associated waterfowl decoy 200 without risking damage to the waterfowl decoy 200. The lock release mechanism 65 prevents any undesired motion of the weight 4 relative to the housing 2 while also allowing the line 5 to be manually let out even when the lock release mechanism 65 is in the otherwise locked configuration. The manner in which the spool 40 rotates about an annular sealing element 55 prevents the ingress of water towards the power spring 60 used to rewind the line 5 while also providing the proper frictional forces for avoiding an undesirably fast and dangerous approach of the weight 4 towards the housing 2. Lastly, the distance indicating mechanism 100 allows for the operator to know how much line 5 has been let out and how much line 5 has been rewound onto the spool 40 via the audible clicking sounds generated thereby, with rotation of the spool 40 in one direction distinct from the rotation of the spool 40 in the opposing direction.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A weight retraction device for use with a waterfowl decoy, the weight retraction device comprising:
    a housing defining an interior compartment, wherein the housing is independent from and indirectly coupled to a body of the waterfowl decoy;
    a spool rotatably disposed within the interior compartment of the housing;
    a weight attached to a line configured to be wound around the spool, a rotation of the spool in a first rotational direction causing an unwinding of the line from the spool to cause the weight to extend away from the housing, and a rotation of the spool in a second rotational direction causing a rewinding of the line back onto the spool to cause the weight to retract back towards the housing;
    a spring configured to urge the spool to rotate in the second rotational direction; and
    a lock release mechanism configured to normally be in a locked configuration for preventing an undesired rotation of the spool in the second rotational direction, wherein a manual actuation of the lock release mechanism by an operator of the device releases the locked configuration of the lock release mechanism, thereby allowing the spool to rotate in the second rotational direction for retracting the weight back towards the housing, wherein the lock release mechanism includes a push-button actuator disposed at an exterior of the housing, wherein the push-button actuator is configured to be manually actuated by the operator by pressing the push-button actuator inwardly towards the spool within the interior compartment of the housing to release the locked configuration of the lock release mechanism, wherein the push-button actuator is configured to be pressed in a direction parallel to an axis of rotation of the spool and along an axis extending through the spool, wherein the lock release mechanism includes a pawl configured to normally engage a ratchet structure of the spool for placing the lock release mechanism in the locked configuration.

2. The weight retraction device of claim 1, wherein the manual actuation of the lock release mechanism causes the pawl to disengage from the ratchet structure of the spool for releasing the locked configuration of the lock release mechanism.

3. The weight retraction device of claim 1, wherein the pawl includes an inclined surface inclined relative to a radial direction of the spool and the ratchet structure includes a complimentary inclined surface inclined relative to the radial direction of the spool, the inclined surface of the pawl configured to engage the inclined surface of the ratchet structure when the lock release mechanism is in the locked configuration.

4. The weight retraction device of claim 3, wherein the pawl includes a curved surface opposite the inclined surface thereof and wherein the ratchet structure includes a curved surface opposite the inclined surface thereof, wherein the curved surface of the pawl is configured to slide over the curved surface of the ratchet structure when the spool is rotated in the first rotational direction.

5. The weight retraction device of claim 1, wherein the spool is configured to be rotatable in the first rotational direction for extending the weight away from the housing when the lock release mechanism is in the locked configuration.

6. The weight retraction device of claim 5, wherein a manual pulling of the weight or the line causes the spool to rotate in the first rotational direction for extending the weight away from the housing when the lock release mechanism is in the locked configuration.

7. The weight retraction device of claim 1, wherein the push-button actuator is disposed at a first end portion of a lever structure pivotally mounted to the housing, and wherein a second end of the lever structure is configured to selectively reposition the pawl configured to normally engage the ratchet structure of the spool for placing the lock release mechanism in the locked configuration, wherein the lever structure is configured to pivot about an axis of rotation arranged perpendicular to the axis of rotation of the spool.

8. The weight retraction device of claim 7, wherein the pressing of the push-button actuator causes the lever structure to pivot about the axis of rotation thereof with the second end of the lever structure causing the pawl to disengage from the ratchet structure of the spool to release the locked configuration of the lock release mechanism.

9. The weight retraction device of claim 1, further comprising a distance indicating mechanism configured to produce a sound audible to the operator when a preselected length of the line is unwound from the spool or rewound back onto the spool.

10. The weight retraction device of claim 9, wherein the distance indicating mechanism includes a resilient strip mounted to the housing and a gear operably engaging the spool and configured to rotate in unison therewith, the gear having a projection projecting therefrom at a distance from an axis of rotation of the gear, the projection configured to periodically flex the resilient strip for creating the sound during rotation of the gear in unison with the spool.

11. The weight retraction device of claim 10, wherein the resilient strip is curved to cause the resilient strip to be flexed to a greater extent when the spool rotates in the first rotational direction than when the spool rotates in the second rotational direction.

12. The weight retraction device of claim 1, wherein the housing includes a plurality of drainage openings configured to allow for drainage of water from the interior compartment of the housing and for introduction of air into the interior compartment of the housing.

13. The weight retraction device of claim 1, wherein the housing includes a connecting shaft configured for coupling to an independently provided connector used to indirectly couple the housing of the weight retraction device to the waterfowl decoy, wherein the weight extends in a direction away from and perpendicular to the connecting shaft with respect to a central axis of the connecting shaft during the first rotational direction thereof, and wherein the weight extends in a direction towards and perpendicular to the connecting shaft with respect to the central axis of the connecting shaft during the second rotational direction thereof.

\* \* \* \* \*